US007007998B2

(12) United States Patent
Toyofuku

(10) Patent No.: US 7,007,998 B2
(45) Date of Patent: Mar. 7, 2006

(54) MOTORCYCLE

(75) Inventor: Kenji Toyofuku, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 83 days.

(21) Appl. No.: 10/874,437

(22) Filed: Jun. 23, 2004

(65) Prior Publication Data

US 2004/0264204 A1    Dec. 30, 2004

(30) Foreign Application Priority Data

Jun. 27, 2003  (JP) ............................. 2003-185760
Apr. 21, 2004  (JP) ............................. 2004-125505

(51) Int. Cl.
*B62J 17/04* (2006.01)
(52) U.S. Cl. .................................................. 296/78.1
(58) Field of Classification Search ................ 296/78.1
See application file for complete search history.

(56) References Cited

FOREIGN PATENT DOCUMENTS

| JP | 06-016166 | 1/1994 |
|----|-----------|--------|
| JP | 408258772 | * 10/1996 |
| JP | 2000-062668 | 2/2000 |
| JP | 2001-151181 | 6/2001 |
| JP | 2002-166870 | 6/2002 |

\* cited by examiner

*Primary Examiner*—Dennis H. Pedder

(74) *Attorney, Agent, or Firm*—Hogan & Hartson, L.L.P.

(57) ABSTRACT

A motorcycle capable of reducing air resistance against a portion of a fairing located on a headlight and improving rigidity of the portion of the fairing located on the headlight is provided. In this motorcycle, the headlight includes a front upper edge formed to outwardly extend beyond a pair of rearview mirror supports, and the fairing includes a screen having a lower edge arranged to be substantially entirely adjacent to the upper edge of the headlight.

21 Claims, 12 Drawing Sheets

MOTORCYCLE

BACKGROUND OF THE INVENTION

1. Field of the Invention

The present invention relates to a motorcycle, and more particularly, it relates to a motorcycle comprising a fairing including a screen.

2. Description of the Background Art

A motorcycle comprising a fairing including a screen is known in general. Such a motorcycle is disclosed in Japanese Patent Laying-Open No. 2002-166870, for example. This gazette discloses a motorcycle comprising a headlight formed to cross-directionally extend along its body and a fairing arranged to enclose the headlight. The fairing of the motorcycle according to Japanese Patent Laying-Open No. 2002-166870 is constituted of a windshield (screen) and a cowling (front cowling). The screen is arranged only on a portion located on the center of the headlight formed to cross-directionally extend along the body. The front cowling is formed to enclose the headlight except the portion located on the center of the headlight, and has an opening for mounting the screen on the portion located on the center of the headlight. The outer edge of the screen is bonded to the inner edge of the opening of the front cowling through two screws on the aforementioned portion located on the center of the headlight.

According to the fairing disclosed in the aforementioned Japanese Patent Laying-Open No. 2002-166870, running wind hitting the front surface of the headlight is partially directed upward from this front surface when the motorcycle is in motion. The upwardly directed running wind flows along the front surface of the fairing consisting of the screen located on the headlight and the front cowling, and is backwardly guided beyond the fairing. According to the aforementioned Japanese Patent Laying-Open No. 2002-166870, further, the running wind flowing along the front surface of the portion of the fairing located on the headlight also flows along the junction between the screen and the front cowling.

According to the aforementioned Japanese Patent Laying-Open No. 2002-166870, however, the heads of the two screws are exposed on the surface of the junction between the screen located on the headlight and the front cowling, to disadvantageously increase air resistance of the running wind against the portion of the fairing located on the headlight. Further, a step causing increase of air resistance is formed on the junction (boundary) between the upper surfaces of the screen and the front cowling, to also disadvantageously increase the air resistance of the running wind against the portion of the fairing located on the headlight.

According to the aforementioned Japanese Patent Laying-Open No. 2002-166870, in addition, the junction between the screen and the front cowling is formed to extend entirely above the headlight, to disadvantageously reduce rigidity of the portion of the fairing located on the headlight.

SUMMARY OF THE INVENTION

The present invention has been proposed in order to solve the aforementioned problems, and an object of the present invention is to provide a motorcycle capable of reducing air resistance against a portion of a fairing located on a headlight and improving rigidity of the portion of the fairing located on the headlight.

In order to attain the aforementioned object, a motorcycle according to a first aspect of the present invention comprises a pair of rearview mirrors supported by a pair of rearview mirror supports arranged at a prescribed interval along the cross direction of a body, a headlight formed to outwardly extend beyond the pair of rearview mirror supports and a fairing arranged to enclose the headlight. The headlight includes a front upper edge formed to outwardly extend beyond the pair of rearview mirror supports, and the fairing includes a screen having a lower edge arranged to be substantially entirely adjacent to the upper edge of the headlight.

In the motorcycle according to the first aspect, as hereinabove described, the screen of the fairing is formed to have the lower edge arranged to be substantially entirely adjacent to the upper edge of the headlight, so that the portion of the fairing located on the upper edge of the headlight is entirely constituted of only the screen. Thus, the portion of the fairing located on the upper edge of the headlight has no junction between the screen and the front cowling, so that air resistance against the portion of the fairing located on the upper edge of the headlight is not increased due to the junction between the screen and the front cowling. Consequently, the air resistance against the portion of the fairing located on the headlight can be reduced. Particularly according to the first aspect, the upper edge of the headlight arranged adjacent to the lower edge of the screen is formed to outwardly extend beyond the pair of rearview mirror supports supporting the pair of rearview mirrors so that the portion of the fairing located on the headlight has no junction between the screen and the front cowling causing increase of the air resistance up to a portion close to the outermost front portion of the body, whereby the air resistance against the portion of the fairing located on the headlight can be further reduced. According to the first aspect, further, the portion of the fairing located on the upper edge of the headlight can be entirely constituted of only the screen as hereinabove described, whereby the rigidity of the portion of the fairing located on the headlight can be improved as compared with a case where the portion of the fairing located on the upper edge of the headlight has the junction between the screen and the front cowling. Particularly according to the first aspect, the portion of the fairing located on the headlight can be provided with no junction between the screen and the front cowling up to the portion close to the outermost front portion of the body as hereinabove described, whereby the rigidity of the portion of the fairing located on the headlight can be further improved.

In the aforementioned motorcycle according to the first aspect, the headlight preferably includes first and second headlight parts having first and second light sources arranged to horizontally extend with respect to the cross-directional center of the body respectively, the upper edge preferably includes respective front upper edges of the first and second headlight parts, and the lower edge of the screen is preferably arranged to be substantially entirely adjacent to the upper edges of the first and second headlight parts. According to this structure, the air resistance against the portion of the fairing located on the first and second headlight parts can be easily reduced and the rigidity of the portion of the fairing located on the first and second headlight parts can be improved.

In the aforementioned structure having the first and second headlight parts, a portion of the lower edge of the screen located substantially at the center along the cross direction of the body is preferably fixed to a body frame in the vicinity of the boundary between the first and second headlight parts. According to this structure, the portion of the lower edge of the screen located substantially at the center along the cross direction of the body is fixed to the body frame also when this portion downwardly extends beyond the portion close to the boundary between the first and second headlight parts, whereby the screen can be inhibited from reduction of the rigidity resulting from the downwardly extending portion of the lower edge.

In the aforementioned structure having the portion of the lower edge of the screen fixed to the body frame, the first and second headlight parts may be separated from each other in the vicinity of the cross-directional center of the body at least on the front surface of the body, and the portion of the lower edge of the screen located substantially at the center may downwardly extend through a region separating the first and second headlight parts from each other and may be fixed to the body frame. According to this structure, the lower edge of the screen can be fixed to the body frame under the first and second headlight parts, whereby the air resistance against the screen (the fairing) located on the first and second headlight parts can be prevented from increase resulting from the portion of the lower edge of the screen fixed to the body frame.

In this case, the portion of the lower edge of the screen located substantially at the center preferably includes a backwardly bent part fixed to the body frame. According to this structure, the portion of the lower edge of the screen fixed to the body frame can be inhibited from location on the front surface of the screen, whereby running wind can smoothly flow along the front surface of the screen. Also when the lower edge of the screen is fixed to the body frame, therefore, the air resistance against the front surface of the screen can be inhibited from increase. Further, the portion of the lower edge of the screen fixed to the body frame can be so inhibited from location on the front surface of the screen as to improve the external appearance of the motorcycle.

In the aforementioned structure having the lower edge of the screen fixed to the body frame, the fairing preferably includes a front cowling, and the portion of the lower end of the screen located substantially at the center is preferably fixed to the body frame through the front cowling. According to this structure, the portion of the lower end of the screen substantially located at the center can be easily fixed to the body frame.

In the aforementioned motorcycle according to the first aspect, the fairing preferably includes a front cowling arranged under the headlight, and the lower edge of the screen and the upper edge of the front cowling are preferably bonded to each other on the outer side of the outer end of the headlight. According to this structure, the junction between the lower edge of the screen and the upper edge of the front cowling can be arranged on the outer side of the outer end of the headlight exposed to a low pressure applied by the running wind, whereby the air resistance can be effectively inhibited from increase resulting from the junction between the lower edge of the screen and the upper edge of the front cowling.

In the aforementioned motorcycle according to the first aspect, the fairing preferably includes a front cowling arranged under the headlight, and the motorcycle preferably further comprises a shield integrally formed with the front cowling to backwardly and upwardly extend from the upper edge of the front cowling and arranged at the back of the screen. According to this structure, the shield can prevent a meter or the like from outside observation through the screen. Further, the shield is so integrated with the front cowling as to attain unitedness between the shield and the front cowling. Thus, the motorcycle can be improved in external appearance. Further, the shield is so integrated with the front cowling as to serve as a reinforcement for the front cowling, whereby the rigidity of the front cowling can be improved.

In the aforementioned motorcycle according to the first aspect, the fairing preferably includes a front cowling arranged under the headlight, and the motorcycle preferably further comprises a shield integrally formed with the front cowling to backwardly and upwardly extend from the upper edge of the front cowling and arranged at the back of the screen so that the screen is fixed to the shield in the vicinity of the pair of rearview mirror supports. According to this structure, the screen is fixed to the shield in the vicinity of the pair of rearview mirror supports supporting the pair of rearview mirrors functionally arranged on the outermost front portion of the body, whereby the portions of the screen fixed to the shield can be arranged in the vicinity of both outermost side portions along the cross direction of the body. Thus, the interval between the portions of the screen fixed to the shield can be so increased that the screen and the shield can be strongly supported as compared with a case where the interval between the portions of the screen fixed to the shield is small.

In this case, the pair of rearview mirrors include boots attached to cover the lower portions of the pair of rearview mirrors, and the portion of the screen fixed to the shield is covered with the boots. According to this structure, the motorcycle can reduce the air resistance of the running wind against the screen while improving the external appearance as compared with a case where the portion of the screen fixed to the shield is exposed.

In the aforementioned motorcycle according to the first aspect, the screen preferably includes notches detachably fitted into the lower portions of the pair of rearview mirrors. According to this structure, the screen can be attached/detached while keeping the pair of rearview mirrors attached to the pair of rearview mirror supports, whereby workability for attaching/detaching the screen can be improved.

In the aforementioned motorcycle having the screen including the notches, the pair of rearview mirrors preferably include boots attached to cover the lower portions of the pair of rearview mirrors, and the boots are preferably attached to cover the notches. According to this structure, the motorcycle can reduce the air resistance of the running wind against the screen while improving the external appearance as compared with a case where the notches are exposed.

The aforementioned motorcycle including the boots covering the notches preferably further comprises a panel fixed to a body frame at the back of the notches of the screen, and the lower ends of the rear portions of the boots preferably downwardly extend to cover the portion of the panel fixed to the body frame. According to this structure, the portion of the panel fixed to the body frame can be so easily covered with the lower ends of the rear portions of the boots as to improve the external appearance of the motorcycle.

In the aforementioned motorcycle having the screen including the notches, the notches preferably include first ribs formed to upwardly project from edges of the notches. According to this structure, the notches can be reinforced with the first ribs, whereby the screen provided with the notches can be inhibited from reduction of rigidity.

In this case, the pair of rearview mirrors include boots attached to cover the lower portions of the pair of rearview mirrors, and the inner surfaces of the lower ends of the boots are attached along the outer surfaces of the first ribs of the notches. According to this structure, the lower ends of the boots can be located on prescribed positions and held in prescribed shapes through the first ribs, thereby improving the external appearance of the body.

In the aforementioned motorcycle according to the first aspect, the headlight preferably includes a housing having a lens part, a concave engaging part is preferably provided in the vicinity of the upper edge of the lens part of the housing, and the lower edge of the screen of the fairing is preferably engaged with the concave engaging part. According to this structure, the lower edge of the screen can be fixed to be adjacent to the upper edge of the lens part of the housing of the headlight, whereby the screen can be easily mounted on the housing of the headlight. Further, the housing of the headlight has high rigidity due to its box shape in general. Therefore, the screen mounted on the rigid housing of the headlight can be further improved in rigidity.

In the aforementioned motorcycle provided with the concave engaging part, the housing preferably includes a second rib partially constituting the concave engaging part. According to this structure, the second rib serving also as a reinforcing rib can reinforce the housing of the headlight while partially constituting the concave engaging part.

In the aforementioned motorcycle provided with the concave engaging part, the fairing preferably includes a front cowling arranged under the headlight, the motorcycle preferably further comprises a shield integrally formed with the front cowling to backwardly and upwardly extend from the upper edge of the front cowling and arranged at the back of the screen, and the shield preferably includes a third rib partially constituting the concave engaging part. According to this structure, the third rib serving also as a reinforcing rib can reinforce the shield while partially constituting the concave engaging part.

In the aforementioned motorcycle provided with the concave engaging part, the concave engaging part is preferably arranged at the back of the upper edge of the lens part, and the lower edge of the screen preferably includes a backwardly bent engaging part engaged with the concave engaging part. According to this structure, the junction between the engaging part provided on the lower edge of the screen and the concave engaging part is hardly observed from the front direction, whereby the external appearance of the motorcycle can be improved.

In the aforementioned motorcycle according to the first aspect, the upper edge of the headlight may have an upwardly convexed arcuate shape.

A motorcycle according to a second aspect of the present invention comprises a headlight including first and second headlight parts having first and second light sources arranged to horizontally extend with respect to the cross-directional center of a body respectively and a fairing arranged to enclose the first and second headlight parts. The first and second headlight parts include front upper edges respectively, and the fairing includes a screen having a lower edge arranged to be substantially entirely adjacent to the upper edges of the first and second headlight parts.

In the motorcycle according to the second aspect, as hereinabove described, the screen of the fairing is formed to have the lower edge arranged to be substantially entirely adjacent to the upper edges of the first and second headlight parts so that the portion of the fairing located on the upper edges of the first and second headlight parts is entirely constituted of only the screen. Thus, the portion of the fairing located on the upper edges of the first and second headlight parts has no junction between the screen and a front cowling, so that air resistance against the portion of the fairing located on the upper edges of the first and second headlight parts is not increased due to the junction between the screen and the front cowling. Consequently, the air resistance against the portion of the fairing located on the first and second headlight parts can be reduced. Further, the lower edge of the screen is arranged to be adjacent to the upper edges of the first and second headlight parts arranged to horizontally extend with respect to the cross-directional center of the body respectively so that the portion of the fairing located on the first and second headlight parts can be provided with no junction between the screen and the front cowling causing increase of air resistance up to a portion close to the outermost front portion of the body as compared with a case of arranging the lower edge of the screen to be adjacent to the upper edge of a single headlight part having a single light source. Thus, the air resistance against the portion of the fairing located on the first and second headlight parts can be further reduced. According to the second aspect, the portion of the fairing located on the upper edges of the first and second headlight parts can be entirely constituted of only the screen as hereinabove described, whereby the rigidity of the portion of the fairing located on the first and second headlight parts can be improved as compared with a case where the portion of the fairing located on the upper edges of the first and second headlight parts includes the junction between the screen and the front cowling. Further, the portion of the fairing located on the first and second headlight parts can be provided with no junction between the screen and the front cowling up to the portion close to the outermost front portion of the body dissimilarly to the case of arranging the lower edge of the screen to be adjacent to the upper edge of a single headlight part having a single light source as hereinabove described, whereby the rigidity of the portion of the fairing located on the first and second headlight parts can be further improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

A motorcycle 1 according to the embodiment is described with reference to FIGS. 1 to 15. Referring to FIGS. 2 and 9 to 15, arrow F denotes the forward traveling direction of the motorcycle 1.

Figure 1:
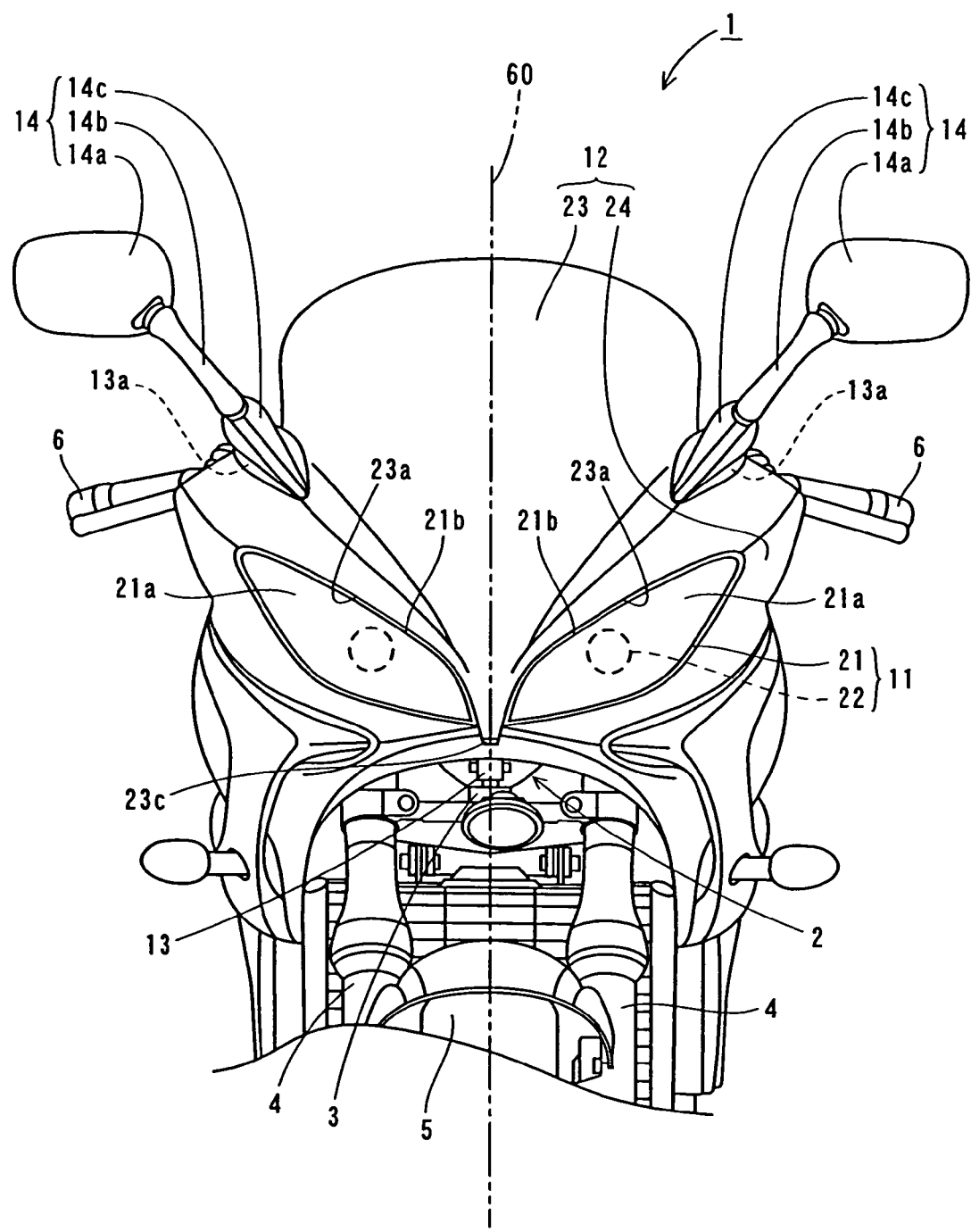
FIG. 1 is a partially fragmented front elevational view of a motorcycle according to an embodiment of the present invention.

In the motorcycle 1 according to this embodiment, a pair of front forks 4 are rotatably mounted on the front end of a frame body 3 of a body frame 2, as shown in FIG. 1. A front wheel 5 is rotatably mounted on the front forks 4. A handle 6 is mounted on the upper portions (not shown) of the front forks 4. A stay 13 constituting the front portion of the body frame 2 is mounted on the vicinity of the front end of the frame body 3. A running driving engine 7 and a fuel tank 8 are mounted on the frame body 3 of the body frame 2, as shown in FIG. 2.

Figure 2:
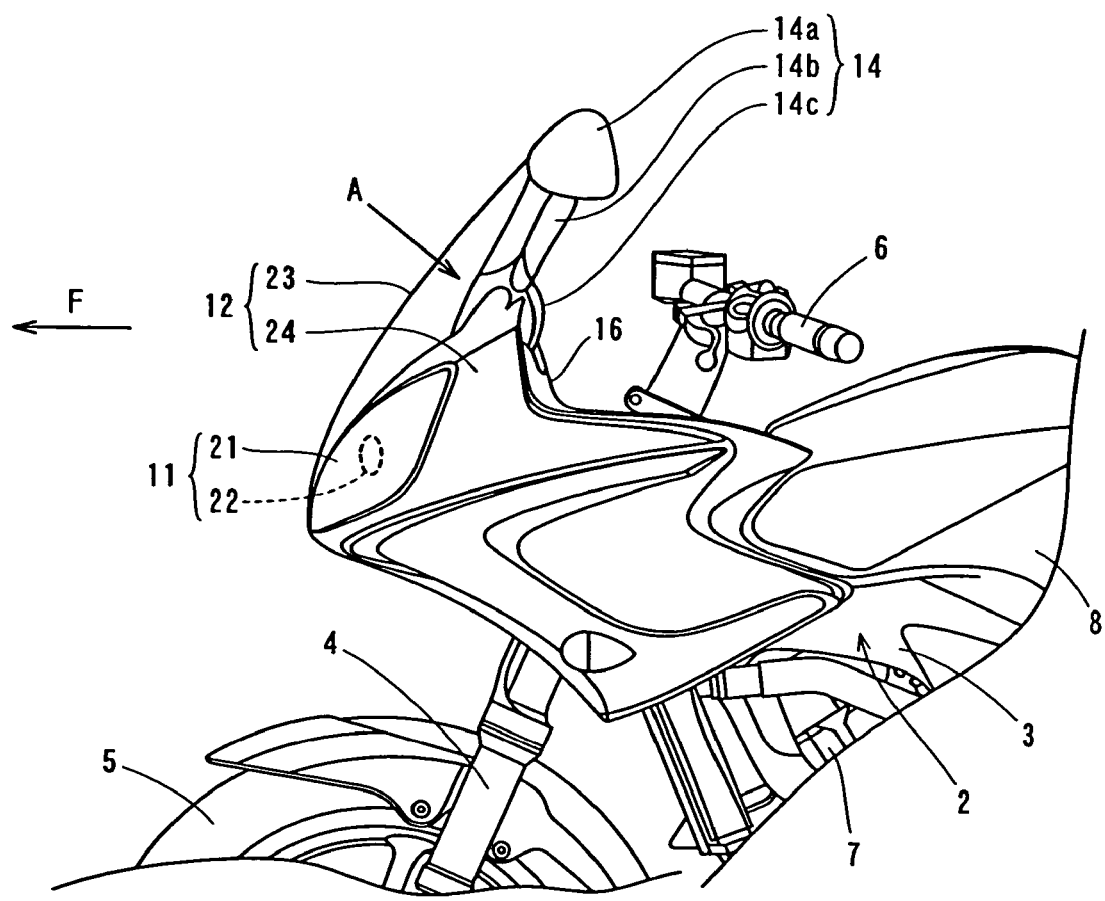
FIG. 2 is a side elevational view of a front part of the motorcycle according to the embodiment of the present invention.
Figure 3:
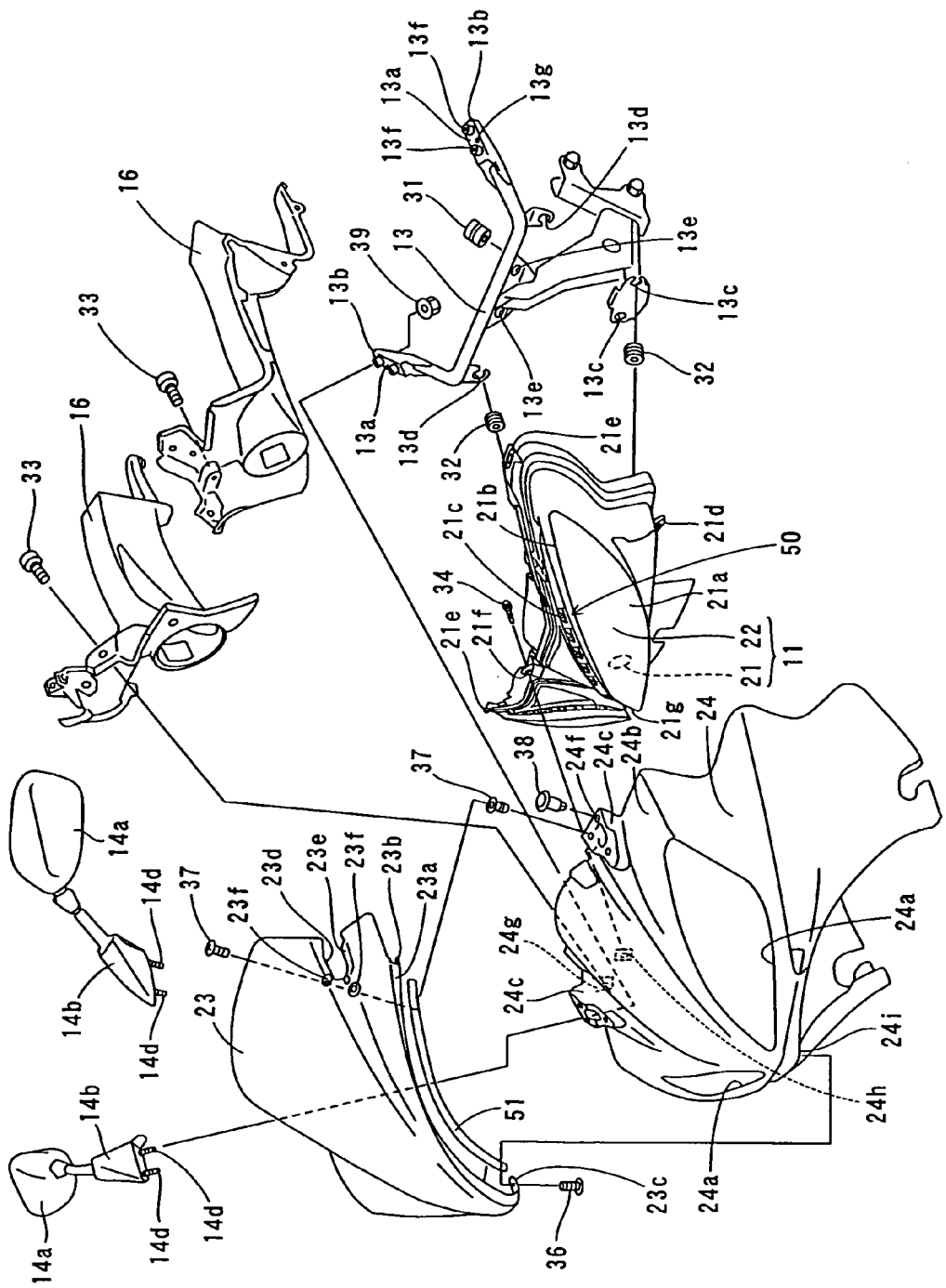
FIG. 3 is an exploded perspective view of the front part of the motorcycle according to the embodiment of the present invention.
Figure 7:
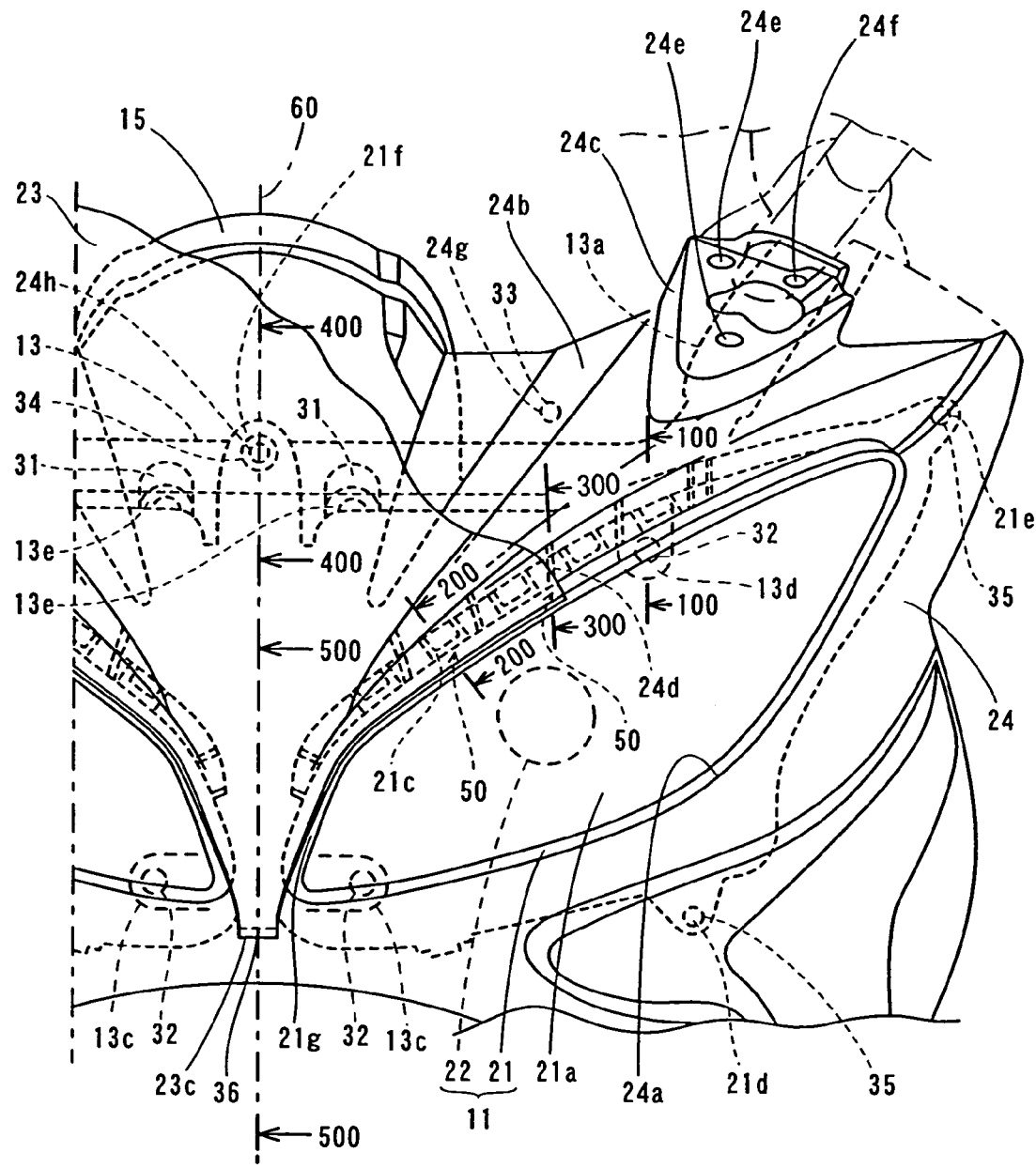
FIG. 7 is a partially fragmented enlarged view of the motorcycle according to the embodiment of the present invention shown in FIG. 1.
Figure 8:
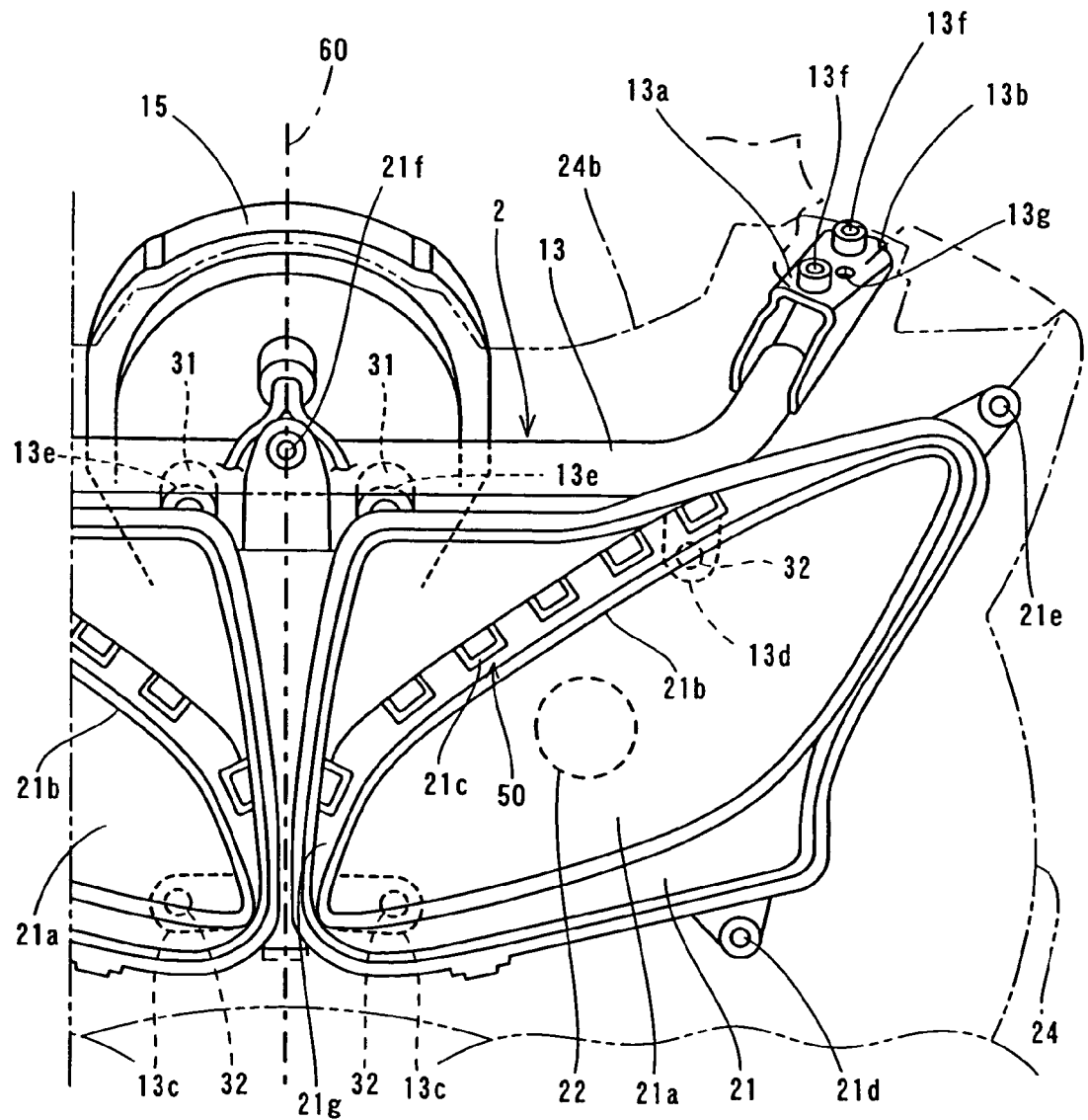
FIG. 8 is a partially fragmented enlarged view of the motorcycle shown in FIG. 7 from which the fairing is removed.
Figure 9:
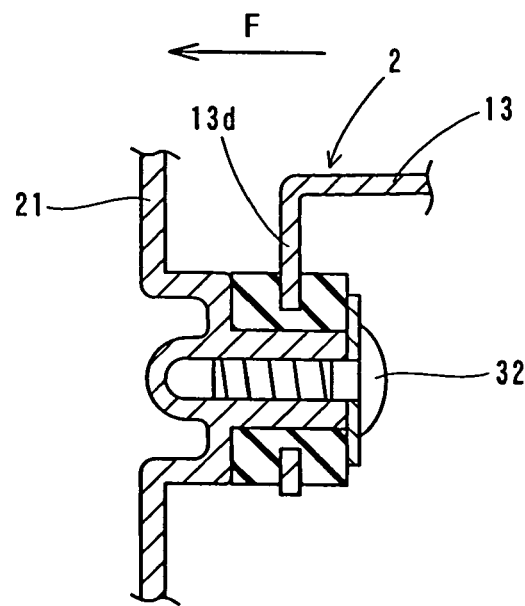
FIG. 9 is a sectional view of the motorcycle taken along the line 100—100 in FIG. 7.
Figure 15:
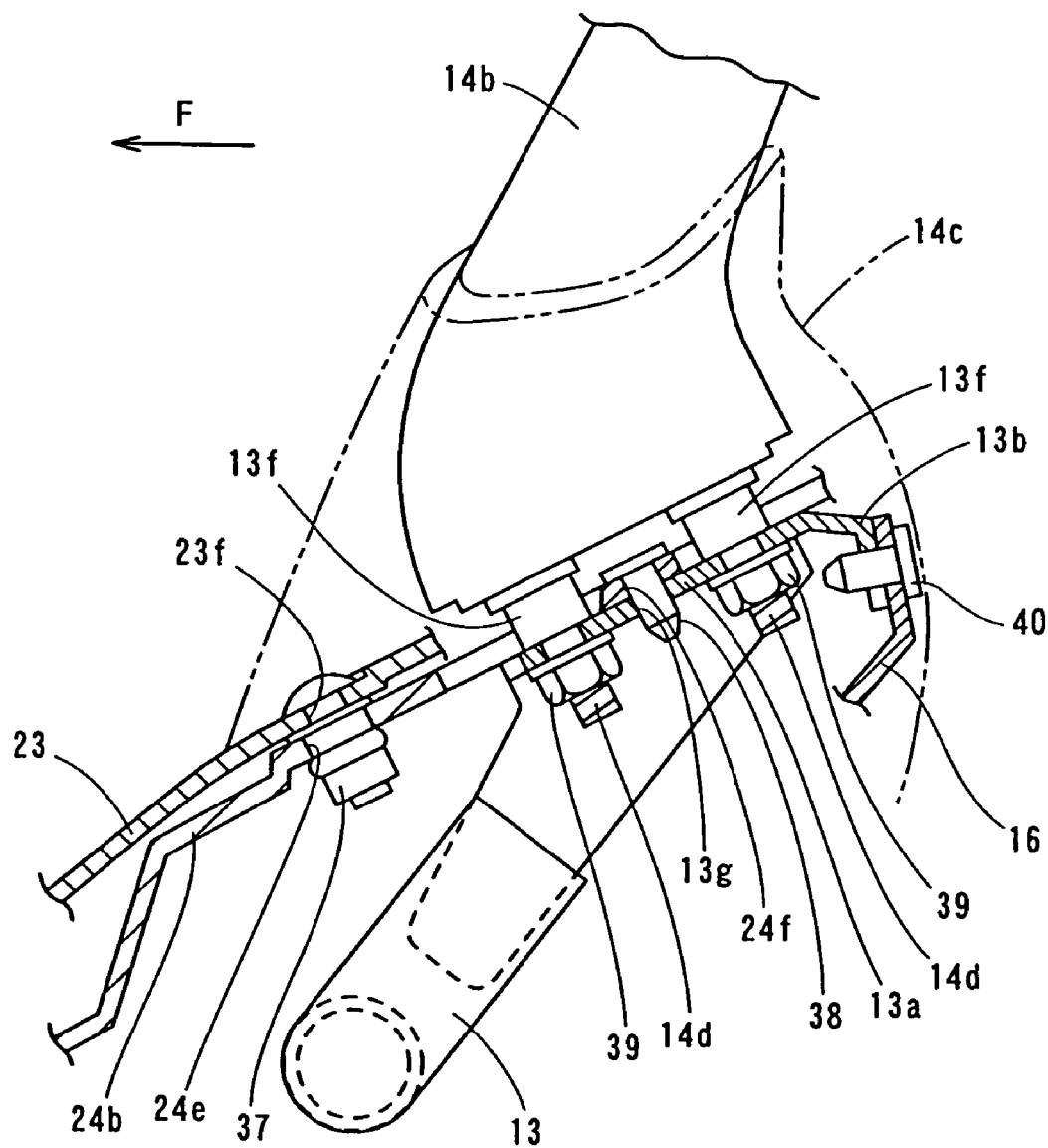
FIG. 15 is a sectional view of the portion around the rearview mirror supports taken along the line 600—600 in FIG. 14.

As shown in FIGS. 1 to 3, the motorcycle 1 according to this embodiment comprises a headlight 11, a fairing 12 consisting of a screen 23 and a front cowling 24 arranged to enclose the headlight 11, a pair of rearview mirrors 14 arranged in the vicinity of both outermost side portions along the cross direction of the body and supported by a pair of rearview mirror supports 13a of a stay 13, a meter 15 (see FIG. 7) arranged at the back of the screen 23 and a panel 16 (see FIGS. 2 and 3) for the meter 15 and the like. The stay 13 constituting the front portion of the body frame 2 is provided with the pair of rearview mirror supports 13a having fixed holes 13f and 13g, panel supports 13b provided on the rear ends of the rearview mirror supports 13a, headlight supports 13c and 13d and meter supports 13e, as shown in FIG. 3. The meter 15 is mounted on the meter supports 13e of the stay 13 through two fixing members 31, as shown in FIGS. 3 and 8. The panel 16 is mounted on the panel supports 13b of the stay 13 through two fixing members 40, as shown in FIGS. 3 and 15.

Figure 4:
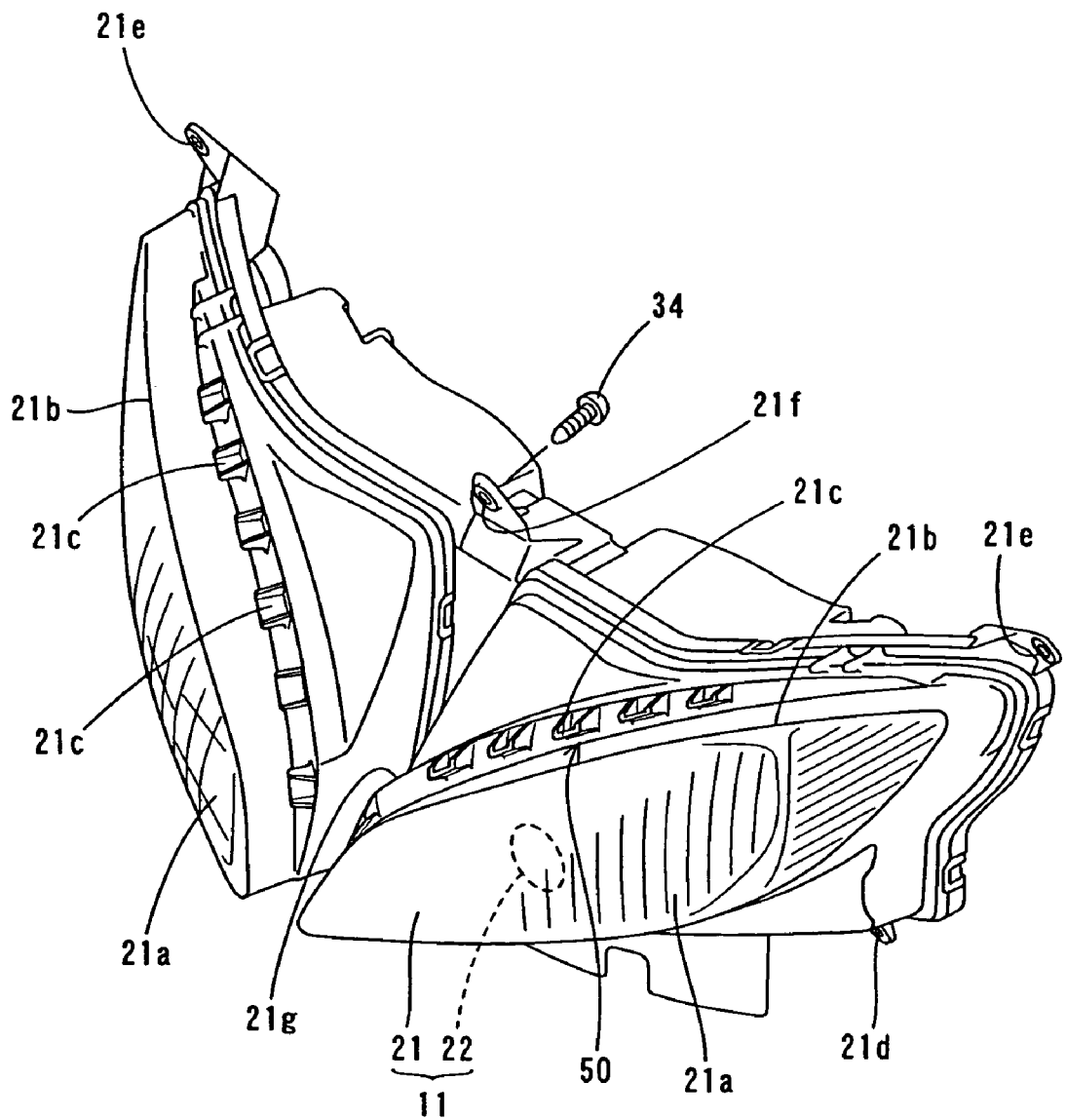
FIG. 4 is a perspective view showing a headlight of the motorcycle according to the embodiment of the present invention.

As shown in FIGS. 1 and 4, the headlight 11 includes a box-shaped resin housing 21 having a pair of lens parts 21a and a pair of bulbs 22 stored in the lens parts 21a respectively for serving as light sources. The pair of lens parts 21a of the headlight 11 are examples of the "first head light part" and the "second head light part" in the present invention respectively, and the pair of bulbs 22 are examples of the "first light source" and the "second light source" in the present invention respectively. The housing 21 of the headlight 11 is attached to the headlight supports 13c and 13d of the stay 13 through four fixing members 32, as shown in FIGS. 3, 7 and 8.

Figure 10:
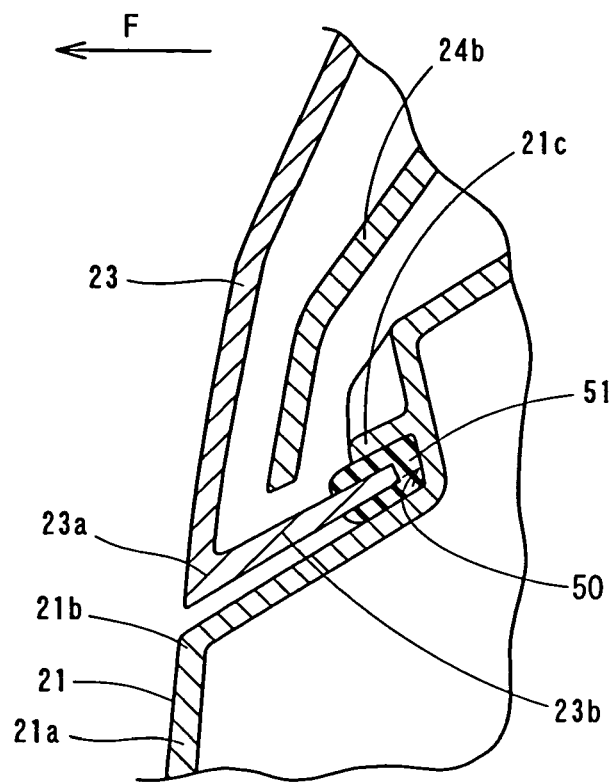
FIG. 10 is a sectional view of the motorcycle taken along the line 200—200 in FIG. 7.

According to this embodiment, the pair of lens parts 21a of the headlight 11 are so arranged as to extend from a cross-sectional center 60 of the body outwardly beyond the pair of rearview mirror supports 13a, as shown in FIG. 1. Upper edges 21b of the pair of lens parts 21a have upwardly convexed arcuate shapes obliquely extending upward from the cross-sectional center 60 of the body respectively. Concave engaging parts 50 are provided at the back of the upper edges 21b of the lens parts 21a, as shown in FIGS. 4 and 10. The upper portions of the concave engaging parts 50 are constituted of a plurality of ribs 21c provided at prescribed intervals. The ribs 21c, serving also as reinforcing ribs, can reinforce the housing 21 of the headlight 11 while constituting the upper portions of the concave engaging parts 50. The ribs 21c are examples of the "second rib" in the present invention. The housing 21 of the headlight 11 is provided with fixing parts 21d and 21e, a fixing part 21f and a groove 21g formed to separate the pair of lens parts 21a from each other, as shown in FIG. 4.

Figure 5:
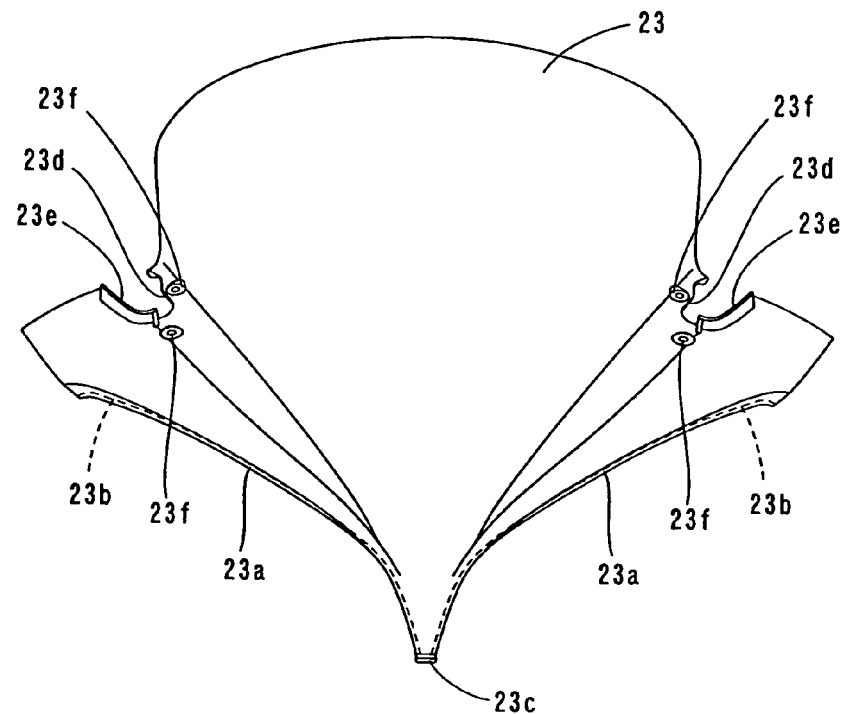
FIG. 5 is a front elevational view showing a screen constituting a fairing of the motorcycle according to the embodiment of the present invention.

The screen 23 constituting the fairing 12 is made of a colorless or palely colored transparent resin material. As shown in FIGS. 3 and 5, this screen 23 includes a lower edge 23a, backwardly bent engaging parts 23b provided on the lower edge 23a to be engaged with the concave engaging parts 50 of the housing 21, a backwardly bent part 23c located at the cross-directional center of the lower edge 23a, a pair of notches 23d fitted into mirror stays 14b of the pair of rearview mirrors 14 (see FIG. 1), ribs 23e formed to upwardly project from partial edges of the pair of notches 23d respectively and two pairs of fixing holes 23f. The ribs 23e are examples of the "first rib" in the present invention.

According to this embodiment, the lower edge 23a of the screen 23 is arranged to be entirely adjacent to the upper edges 21b of the pair of lens parts 21a arranged to extend outwardly beyond the rearview mirror support parts 13a, as shown in FIG. 1. In other words, in this embodiment, the portion of the fairing 12 located on the upper edges 21b of the pair of lens parts 21a is constituted of only the screen 23.

Figure 6:
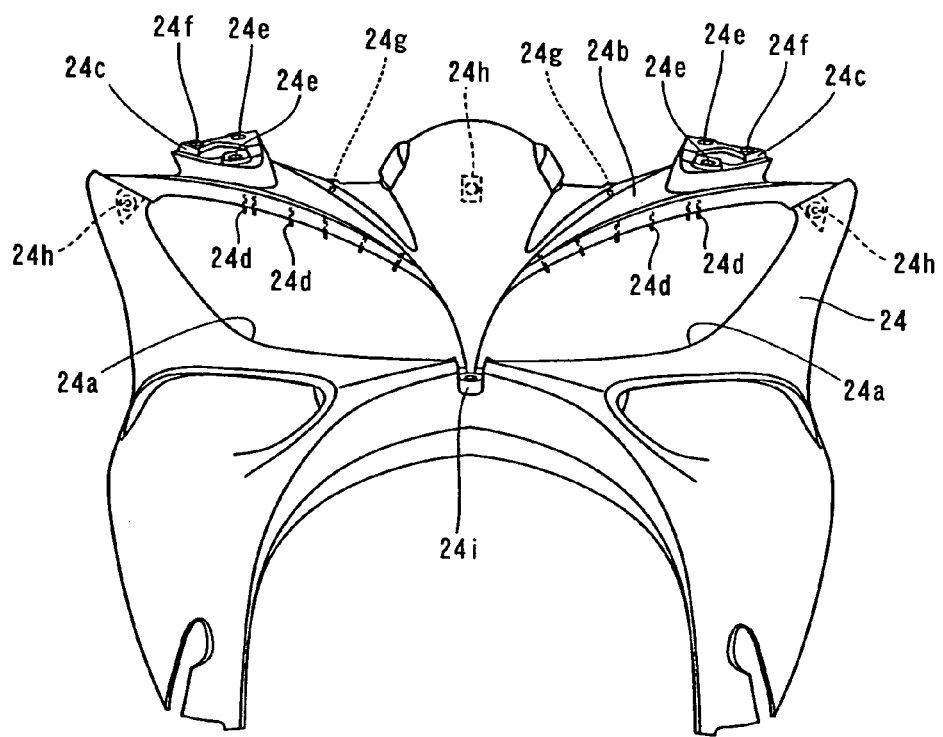
FIG. 6 is a front elevational view showing a front cowling constituting the fairing of the motorcycle according to the embodiment of the present invention.

The front cowling 24 constituting the fairing 12 is made of an opaque resin material. As shown in FIG. 7, this front cowling 24 is fixed to the fixing parts 21d and 21e of the housing 21 through four fixing members 35. The front cowing 24 includes a pair of openings 24a for exposing the pair of lens parts 21a of the headlight 11 respectively, a shield 24b integrally formed with the front cowling 24 to backwardly and upwardly extend from the upper edge of the front cowling 24 and arranged at the back of the screen 23, fixing parts 24c having fixing holes 24e and 24f provided on portions of the shield 24b corresponding to the rearview supports 13a respectively, a plurality of ribs 24d provided on the shield 24b to be downwardly exposed from the upper edges of the openings 24a and fixing parts 24g, 24h and 24i, as shown in FIGS. 3 and 6. The ribs 24d are examples of the "third rib" in the present invention.

According to this embodiment, the upper edge of the front cowling 24 and the lower edge 23a of the screen 23 are bonded to each other on the outer sides of the outer ends of the lens parts 21a of the headlight 11, as shown in FIG. 1. In other words, the upper edge of the front cowling 24 and the lower edge 23a of the screen 23 are bonded to each other on the outer sides of the rearview mirror supports 13a.

Figure 11:
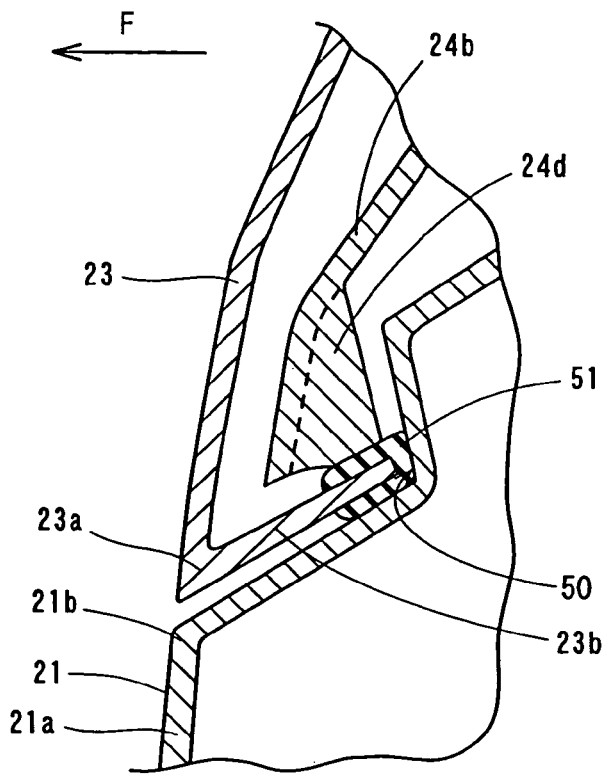
FIG. 11 is a sectional view of the motorcycle taken along the line 300—300 in FIG. 7.

The shield 24b is arranged to cover the meter 15 and the panel 16 from the front direction, as shown in FIGS. 7 and 15. The ribs 24d provided on the shield 24b constitute upper portions of the concave engaging parts 50, as shown in FIGS. 3 and 11. The ribs 24d, also serving as reinforcing ribs, can reinforce the shield 24b while constituting the upper portions of the concave engaging parts 50. In other words, the plurality of ribs 21c of the housing 21 shown in FIGS. 4 and 10 and the plurality of ribs 24*d* of the shield 24*b* shown in FIGS. 3 and 11 constitute the upper portions of the concave engaging parts 50 according to this embodiment.

According to this embodiment, the backwardly bent engaging parts 23*b* provided on the lower edge 23*a* of the screen 23 are press-fitted into the concave engaging parts 50 provided at the back of the upper edges 21*b* of the lens parts 21*a* through rubber elastic members 51, as shown in FIGS. 10 and 11. Thus, the lower edge 23*a* of the screen 23 is fixed to the housing 21 of the headlight 11. The engaging parts 23*b* of the screen 23 are so press-fitted into the concave engaging parts 50 through the rubber elastic members 51 that the rubber elastic members 51 can absorb dimensional errors between the concave engaging parts 50 and the engaging parts 23*b* of the screen 23 upon resin molding.

Figure 13:
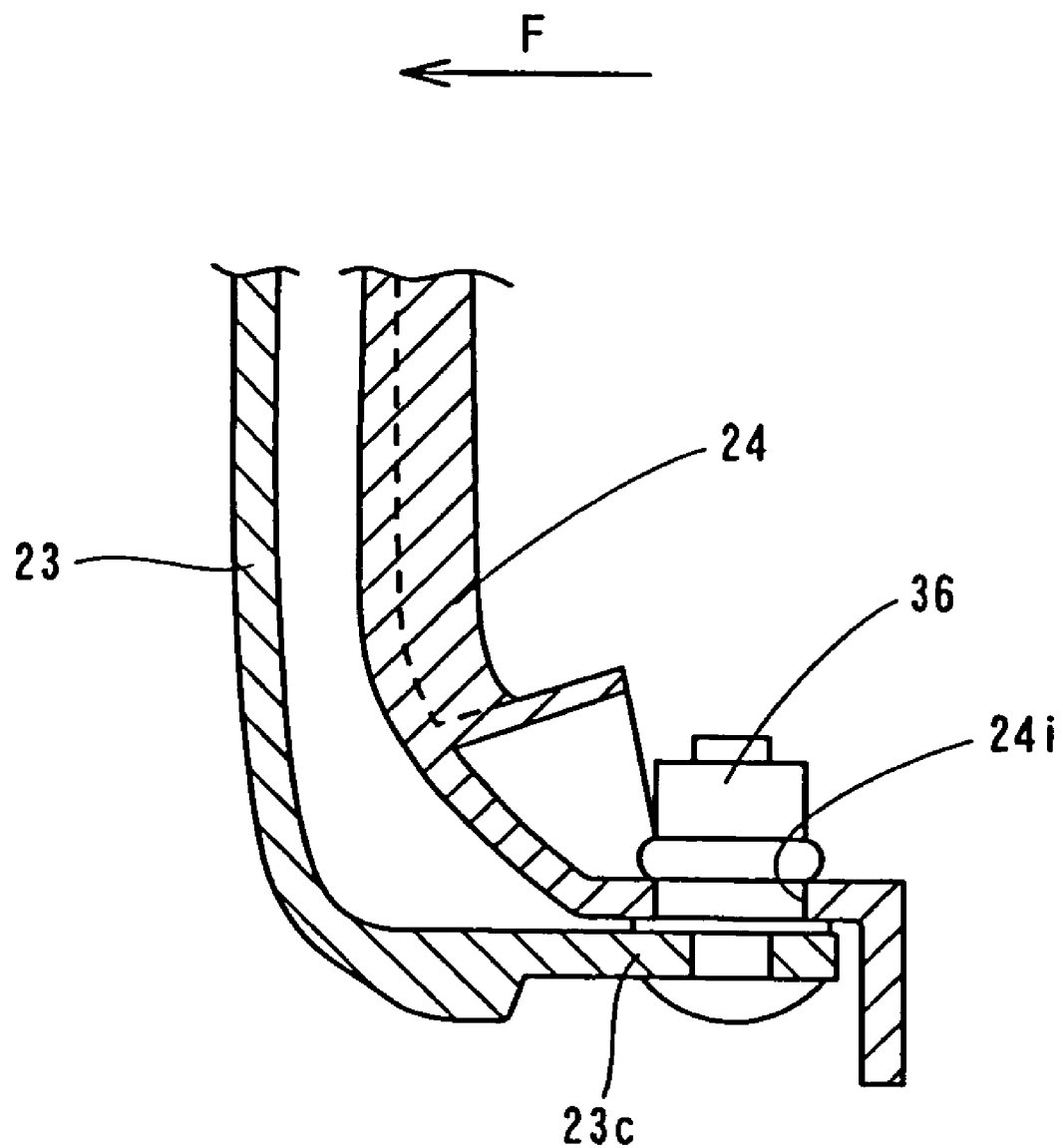
FIG. 13 is a sectional view of the motorcycle taken along the line 500—500 in FIG. 7.
Figure 14:
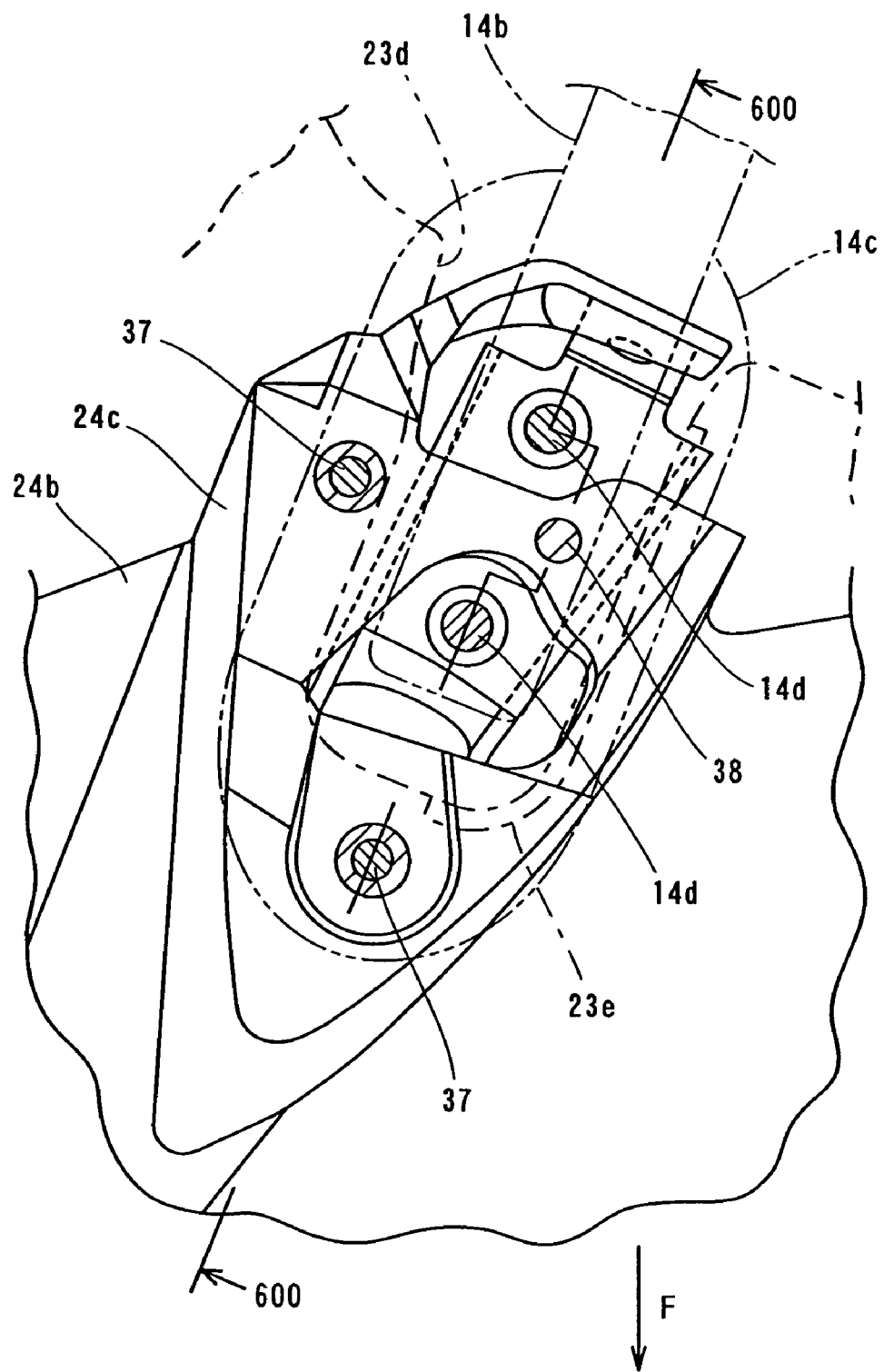
FIG. 14 is a partially fragmented enlarged view of a portion around rearview mirror supports of the motorcycle as viewed along arrow A in FIG. 2.

The backwardly bent part 23*c* located on the central lower end of the lower edge 23*a* of the screen 23 downwardly extends through the groove 21*g* provided between the pair of lens parts 21*a* and is fixed to the fixing part 23*i* provided on the central lower end of the front cowling 24 through a fixing member 36, as shown in FIGS. 3, 7 and 13. Further, the screen 23 is fixed to the shield 24*b* on the fixing parts 23*c* close to the rearview supports 13*a*, as shown in FIGS. 7, 14 and 15. In other words, fixing members 37 are fitted into the pairs of fixing holes 23*f* (see FIGS. 5 and 15) of the screen 23 and the two fixing holes 24*e* (see FIGS. 6 and 15) of the shield 24*b* respectively, thereby fixing the screen 23 and the shield 24*b* to each other.

The shield 24*b* is fixed to the rearview mirror supports 13*a* by fitting fixing members 38 into the fixing holes 24*f* of the fixing parts 24*c* of the shield 24*b* and the fixing holes 13*g* of the rearview mirror supports 13*a* of the stay 13 respectively, as shown in FIGS. 3, 14 and 15. Thus, the shield 24*b* integrally formed with the front cowling 24 is fixed to the rearview mirror supports 13*a* of the stay 13 constituting the front portion of the body frame 2, thereby indirectly fixing the backwardly bent part 23*c* of the lower edge 23*a* of the screen 23 to the front cowling 24. Alternatively, the backwardly bent part 23*c* of the lower edge 23*a* of the screen 23 may be directly fixed to the stay 13 constituting the front portion of the body frame 2.

Figure 12:
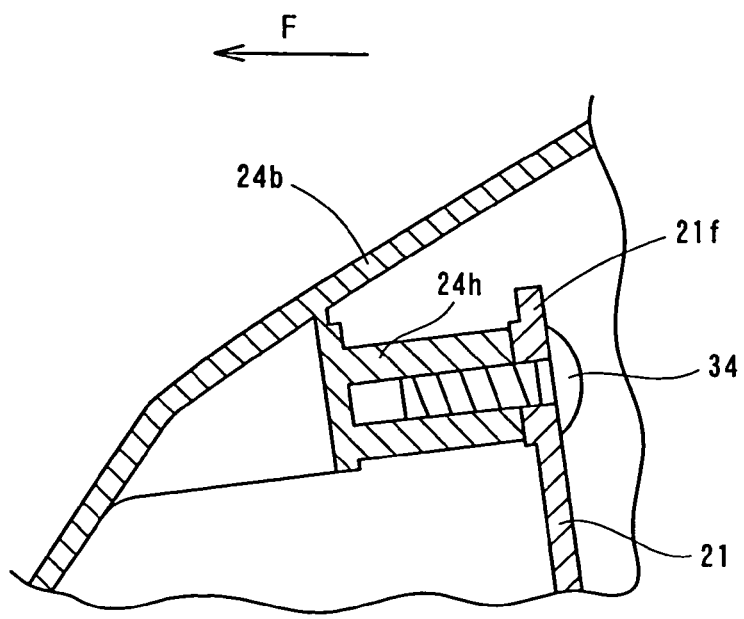
FIG. 12 is a sectional view of the motorcycle taken along the line 400—400 in FIG. 7.

As shown in FIG. 7, the panel 16 (see FIG. 2) is fixed to the fixing parts 24*g* of the shield 24*b* through fixing members 33. As shown in FIGS. 7 and 12, the fixing part 24*h* of the shield 24*b* is fixed to the fixing part 21*f* of the housing 21 through a fixing member 34 at the cross-directional center 60 of the shield 24*b*.

As shown in FIG. 1, each of the rearview mirrors 14 includes a mirror body 14*a*, the mirror stay 14*b* supporting the mirror body 14*a* and a rubber boot 14*c* attached to cover the lower end of the mirror stay 14*b*. Two screws 14*d* are provided on the lower end of each mirror stay 14*b*, as shown in FIG. 3. As shown in FIG. 15, the lower end of the lower portion of the boot 14*c* downwardly extends to be capable of covering a portion of the panel 16 fixed to each panel support 13*b* of the stay 13. The two screws 14*d* of the mirror stay 14*b* of each rearview mirror 14 are inserted into the two fixing holes 13*f* of each rearview mirror support part 13*a* of the stay 13 constituting the body frame 2 and fixed by nuts 39 from the back side.

The boot 14*c* of each rearview mirror 14 is so attached as to cover the portions (see FIG. 15) of the screen 23 and the shield 24*b* fixed to each other, the portions of the shield 24*b* and each rearview mirror support 13*a* of the stay 13 fixed to each other, the portions of the panel 13 and each panel support 13*b* of the stay 13 fixed to each other and each notch 23*d* (see FIG. 14) of the screen 23. The inner surface of the lower end of each rubber boot 14*c* is attached to come into contact with the outer surface of the rib 23*e* of each notch 23*d* while pressing the same. In this case, the lower end of each boot 14*c* and each rib 23*e* may be provided with engaging parts respectively for detachably engaging the lower end of the boot 14*c* with the rib 23*e*.

According to this embodiment, as hereinabove described, the lower edge 23*a* of the screen 23 of the fairing 12 is arranged to be substantially entirely adjacent to the upper edges 21*b* of the headlight 11 (the pair of lens parts 21*a*) so that the portion of the fairing 12 located on the upper edges 21*b* of the headlight 11 is entirely constituted of only the screen 23. Thus, the portion of the fairing 12 located on the upper edges 21*b* of the headlight 11 has no junction between the screen 23 and the front cowling 24 increasing air resistance. Consequently, the air resistance against the portion of the fairing 12 located on the headlight 11 can be reduced. Particularly according to this embodiment, the upper edges 21*b* of the headlight 11 arranged to be adjacent to the lower edge 23*a* of the screen 23 are formed to outwardly extend beyond the rearview mirror supports 13*a* supporting the rearview mirrors 14 arranged on the outermost front portion of the body so that the portion of the fairing 12 located on the headlight 11 has no junction between the screen 23 and the front cowling 24 causing increase of the air resistance, whereby the air resistance against the portion of the fairing 12 located on the headlight 11 can be further reduced.

According to this embodiment, as hereinabove described, the portion of the fairing 12 located on the upper edges 21*b* of the headlight 11 can be entirely constituted of only the screen 23, whereby the rigidity of the portion of the fairing 12 located on the headlight 11 can be improved as compared with a case where the portion of the fairing 12 located on the upper edges 21*b* of the headlight 11 includes the junction between the screen 23 and the front cowling. In particular, the portion of the fairing 12 located on the headlight 11 can be provided with no junction between the screen 23 and the front cowling 24 up to a portion close to the outermost front portion of the body according to this embodiment as hereinabove described, whereby the rigidity of the portion of the fairing 12 located on the headlight 11 can be further improved.

According to this embodiment, as hereinabove described, the backwardly bent part 23*c* is provided at the cross-directional center of the lower edge 23*a* of the screen 23 and fixed to the fixing part 24*i* of the front cowling 24 so that the portion of the lower edge 23*a* of the screen 23 fixed to the front cowling 24 can be inhibited from location on the front surface of the screen 23, whereby running wind can smoothly flow along the front surface of the screen 23. Also when the lower edge 23*a* of the screen 23 is fixed to the front cowling 24, therefore, air resistance against the front surface of the screen 23 can be inhibited from increase. Further, the portion of the lower edge 23*a* of the screen 23 fixed to the front cowling 24 can be so inhibited from location on the front surface of the screen 23 that the external appearance of the motorcycle can be improved. In addition, the backwardly bent part 23*c* of the lower edge 23*a* of the screen 23 is formed to downwardly extend through the groove 21*g* provided between the pair of lens parts 21*a* so that the portion of the backwardly bent part 23*c* of the screen 23 fixed to the front cowling 24 can be arranged under the pair of lens parts 21*a*, whereby air resistance against the screen 23 located on the pair of lens parts 21*a* can be prevented from increase resulting from the portion of the backwardly bent part 23*c* of the screen 23 fixed to the front cowling 24.

Thus, the air resistance against the screen 23 (the fairing 12) located on the pair of lens parts 21*a* can be further inhibited from increase. The backwardly bent part 23*c* of the lower edge 23*a* of the screen 23 is so fixed to the front cowling 24 that the rigidity of the screen 23 can be inhibited from reduction also when the cross-sectional center of the lower edge 23*a* of the screen 23 is formed to downwardly extend.

According to this embodiment, as hereinabove described, the lower edge 23*a* of the screen 23 and the upper edge of the front cowling 24 are bonded to each other on the outer side of the outer end of the headlight 11 (the pair of lens parts 21*a*) so that the junction between the lower edge 23*a* of the screen 23 and the upper edge of the front cowling 24 can be arranged on the outer side of the outer end of the headlight 11 receiving low pressure from the running wind, whereby the air resistance can be effectively inhibited from increase resulting from the junction between the lower edge 23*a* of the screen 23 and the upper edge of the front cowling 24.

According to this embodiment, as hereinabove described, the shield 24*b* backwardly and upwardly extending from the upper edge of the front cowling 24 is arranged at the back of the screen 23 for preventing the meter 15 etc. from outside observation through the screen 23. Further, the shield 24*b* is integrally formed with the front cowling for attaining unitedness between the shield 24*b* and the front cowling 24. Thus, the external appearance of the motorcycle can be improved. Further, the shield 24*b* integrally formed with the front cowling 24 serves as a reinforcement for the front cowling 24, thereby improving the rigidity of the front cowling 24.

According to this embodiment, as hereinabove described, the screen 23 is fixed to the shield 24*b* in the vicinity of the pair of rearview mirror supports 13*a* supporting the rearview mirrors 14 functionally arranged on the outermost sides of the body so that the portions of the screen 23 fixed to the shield 24*b* can be arranged in the vicinity of both outermost sides of the front portion. Thus, the interval between the portions of the screen 23 fixed to the shield 24*b* can be so increased that the screen 23 and the shield 24*b* can be strongly supported as compared with a case where the interval between portions of the screen 23 fixed to the shield 24*b* is small.

According to this embodiment, as hereinabove described, the screen 23 is provided with the notches 23*d* fitted into the mirror stays 14*b* of the rearview mirrors 14 so that the screen 23 can be attached/detached while keeping the rearview mirrors 14 attached to the rearview mirror supports 13*a*, whereby workability for attaching/detaching the screen 23 can be improved.

According to this embodiment, the boots 14*c* of the rearview mirrors 14 cover the notches 23*d* of the screen 23 and the portions of the screen 23 fixed to the shield 24*b*, whereby the air resistance of the running wind against the screen 23 can be reduced and the external appearance of the motorcycle can be improved. Further, the lower ends of the rear portions of the boots 14*c* downwardly extend to cover the portions of the panel 16 fixed to the panel supports 13*b* to be capable of easily covering the portions of the panel 16 fixed to the panel supports 13*b*, whereby the external appearance of the motorcycle can be improved.

According to this embodiment, as hereinabove described, the ribs 23*e* are formed to upwardly project from the edges of the notches 23*d* of the screen 23 to be capable of reinforcing the notches 23*d*, whereby the screen 23 can be inhibited from reduction of the rigidity also when the same is provided with the notches 23*d*. The inner surfaces of the lower ends of the rubber boots 14*c* are so attached as to come into contact with the outer surfaces of the ribs 23*e* of the notches 23*d* while pressing the same so that the ribs 23*e* can locate the lower ends of the boots 14*c* on prescribed positions and hold the same in prescribed shapes, whereby the external appearance of the motorcycle can be improved.

According to this embodiment, as hereinabove described, the backwardly bent engaging parts 23*b* of the lower edge 23*a* of the screen 23 are press-fitted into the concave engaging parts 50 provided in the vicinity of the upper edges 21*b* of the lens parts 21*a* of the housing 21 so that the same can be fixed to be adjacent to the upper edges 21*b* of the lens parts 21*a* of the housing 21, whereby the screen 23 can be easily mounted on the housing 21 of the headlight 11. Further, the housing 21 of the headlight 11 has the rigid box shape, whereby the screen 23 mounted on the rigid housing 21 can be further improved in rigidity. In addition, the backwardly bent engaging parts 23*b* are provided on the lower edge 23*a* of the screen 23 and engaged with the concave engaging parts 50 so that the portions of the lower edge 23*a* of the screen 23 engaged with the concave engaging parts 50 are hardly observed from the front direction, whereby the external appearance of the motorcycle can be improved.

Although the present invention has been described and illustrated in detail, it is clearly understood that the same is by way of illustration and example only and is not to be taken by way of limitation, the spirit and scope of the present invention being limited only by the terms of the appended claims.

For example, while the present invention is applied to a structure provided with two headlight parts (lens parts) having two light sources (bulbs) and outwardly extending beyond horizontal rearview mirror supports in the aforementioned embodiment, the present invention is not restricted to this but is also applicable to a structure provided with two headlight parts (lens parts) having two light sources (bulbs) not outwardly extending beyond horizontal rearview mirror supports.

While the present invention is applied to a structure provided with two headlight parts (lens parts) having two light sources (bulbs) divided at the center to horizontally extend in the aforementioned embodiment, the present invention is not restricted to this but is also applicable to a structure provided with two headlight parts (lens parts) having two light sources (bulbs) not divided at the center but coupled with each other to horizontally extend.

What is claimed is:

1. A motorcycle comprising:
 a pair of rearview mirrors supported by a pair of rearview mirror supports arranged at a prescribed interval along the cross direction of a body;
 a headlight formed to outwardly extend beyond said pair of rearview mirror supports; and
 a fairing arranged to enclose said headlight, wherein
 said headlight includes a front upper edge formed to outwardly extend beyond said pair of rearview mirror supports, and
 said fairing includes a screen having a lower edge arranged to be substantially entirely adjacent to said upper edge of said headlight.

2. The motorcycle according to claim 1, wherein
 said headlight includes first and second headlight parts having first and second light sources arranged to horizontally extend with respect to the cross-directional center of said body respectively,
 said upper edge includes respective front upper edges of said first and second headlight parts, and said lower edge of said screen is arranged to be substantially entirely adjacent to said upper edges of said first and second headlight parts.

3. The motorcycle according to claim 2, wherein
a portion of said lower edge of said screen located substantially at the center along the cross direction of said body is fixed to a body frame in the vicinity of the boundary between said first and second headlight parts.

4. The motorcycle according to claim 3, wherein
said first and second headlight parts are separated from each other in the vicinity of the cross-directional center of said body at least on the front surface of said body, and
said portion of said lower edge of said screen located substantially at the center downwardly extends through a region separating said first and second headlight parts from each other and is fixed to said body frame.

5. The motorcycle according to claim 4, wherein
said portion of said lower edge of said screen located substantially at the center includes a backwardly bent part fixed to said body frame.

6. The motorcycle according to claim 4, wherein
said fairing includes a front cowling, and
said portion of said lower edge of said screen located substantially at the center is fixed to said body frame through said front cowling.

7. The motorcycle according to claim 1, wherein
said fairing includes a front cowling arranged under said headlight, and
said lower edge of said screen and the upper edge of said front cowling are bonded to each other on the outer side of the outer end of said headlight.

8. The motorcycle according to claim 1, wherein
said fairing includes a front cowling arranged under said headlight,
said motorcycle further comprising a shield integrally formed with said front cowling to backwardly and upwardly extend from the upper edge of said front cowling and arranged at the back of said screen.

9. The motorcycle according to claim 1, wherein
said fairing includes a front cowling arranged under said headlight,
said motorcycle further comprising a shield integrally formed with said front cowling to backwardly and upwardly extend from the upper edge of said front cowling and arranged at the back of said screen,
so that said screen is fixed to said shield in the vicinity of said pair of rearview mirror supports.

10. The motorcycle according to claim 9, wherein
said pair of rearview mirrors include boots attached to cover the lower portions of said pair of rearview mirrors, and
the portion of said screen fixed to said shield is covered with said boots.

11. The motorcycle according to claim 1, wherein
said screen includes notches detachably fitted into the lower portions of said pair of rearview mirrors.

12. The motorcycle according to claim 11, wherein
said pair of rearview mirrors include boots attached to cover the lower portions of said pair of rearview mirrors, and said boots are attached to cover said notches of said screen.

13. The motorcycle according to claim 12, further comprising a panel fixed to a body frame at the back of said notches of said screen, wherein
the lower ends of the rear portions of said boots downwardly extend to cover the portion of said panel fixed to said body frame.

14. The motorcycle according to claim 11, wherein
said notches include first ribs formed to upwardly project from edges of said notches.

15. The motorcycle according to claim 14, wherein
said pair of rearview mirrors include boots attached to cover the lower portions of said pair of rearview mirrors, and
the inner surfaces of the lower ends of said boots are attached along the outer surfaces of said first ribs of said notches.

16. The motorcycle according to claim 1, wherein
said headlight includes a housing having a lens part,
a concave engaging part is provided in the vicinity of the upper edge of said lens part of said housing, and
the lower edge of said screen of said fairing is engaged with said concave engaging part.

17. The motorcycle according to claim 16, wherein
said housing includes a second rib partially constituting said concave engaging part.

18. The motorcycle according to claim 16, wherein
said fairing includes a front cowling arranged under said headlight,
said motorcycle further comprising a shield integrally formed with said front cowling to backwardly and upwardly extend from the upper edge of said front cowling and arranged at the back of said screen, wherein
said shield includes a third rib partially constituting said concave engaging part.

19. The motorcycle according to claim 16, wherein
said concave engaging part is arranged at the back of the upper edge of said lens part, and
the lower end of said screen includes a backwardly bent engaging part engaged with said concave engaging part.

20. The motorcycle according to claim 1, wherein
the upper edge of said headlight has an upwardly convexed arcuate shape.

21. A motorcycle comprising:
a headlight including first and second headlight parts having first and second light sources arranged to horizontally extend with respect to the cross-directional center of a body respectively; and
a fairing arranged to enclose said first and second headlight parts, wherein
said first and second headlight parts include front upper edges respectively, and
said fairing includes a screen having a lower edge arranged to be substantially entirely adjacent to said upper edges of said first and second headlight parts.

* * * * *